United States Patent [19]

Ellerbe, Jr.

[11] Patent Number: 5,053,111
[45] Date of Patent: Oct. 1, 1991

[54] METHOD AND APPARATUS FOR THE BATCH DISTILLATION OF WATER

[76] Inventor: William R. Ellerbe, Jr., 32 Petit Ridge Dr., Big Canoe, Ga. 30143

[21] Appl. No.: 444,278

[22] Filed: Dec. 1, 1989

[51] Int. Cl.$^5$ .............................................. B01D 3/42
[52] U.S. Cl. ........................................ 203/1; 137/391; 137/393; 137/395; 159/43.2; 159/44; 202/160; 202/206; 203/2; 203/4; 203/10; 203/100; 203/DIG. 7; 203/DIG. 11; 203/DIG. 18; 364/501
[58] Field of Search ................... 203/4, 10, 100, 1, 2, 203/DIG. 17, DIG. 18, DIG. 7, 39, DIG. 11; 202/160, 185.1, 206; 137/391, 393, 395; 159/43.2, 44; 364/501

[56] References Cited

U.S. PATENT DOCUMENTS

| | | | |
|---|---|---|---|
| 2,803,590 | 8/1957 | Skow | 203/10 |
| 3,269,919 | 8/1966 | Baily et al. | 203/1 |
| 3,291,308 | 12/1966 | Headrick et al. | 203/10 |
| 3,364,731 | 1/1968 | Hook | 73/61.3 |
| 3,503,433 | 3/1970 | Riva et al. | 203/DIG. 18 |
| 3,513,076 | 5/1970 | Lowell | 203/10 |
| 3,696,003 | 10/1972 | Fitch et al. | 202/160 |
| 3,907,683 | 9/1975 | Gilmont | 203/10 |
| 4,022,669 | 5/1977 | Drostholm et al. | 202/202 |
| 4,045,293 | 8/1977 | Cooksley | 203/10 |
| 4,110,170 | 8/1978 | Kirschman et al. | 202/160 |
| 4,260,459 | 4/1981 | Kirschmann | 202/200 |
| 4,401,512 | 8/1983 | Likin, Jr. | 203/DIG. 11 |
| 4,622,102 | 11/1986 | Diebel | 202/202 |
| 4,705,936 | 11/1987 | Fowler | 219/272 |
| 4,810,854 | 5/1987 | Jursich et al. | 219/275 |
| 4,861,435 | 8/1989 | Sweet, Jr. | 203/DIG. 18 |
| 4,888,097 | 12/1989 | Palmer et al. | 203/10 |

FOREIGN PATENT DOCUMENTS 2079908 1/1982 United Kingdom ............... 219/312

Primary Examiner—Virginia Manoharan
Attorney, Agent, or Firm—Griffin Branigan & Butler

[57] ABSTRACT

A method and apparatus for automatically and sequentially distilling batches of water having substantially equal volumes in a plurality of distillation cycles, one batch in each cycle. During each cycle, water is admitted to a boiler tank for a fixed interval of time to form a batch in the tank. The batch of water in the tank is then vigorously boiled while venting the tank through a pipe to the atmosphere. The vigorous boiling is terminated when the temperature within the vent pipe reaches the boiling point of pure water. Upon termination of the vigorous boiling phase, a gentle boiling phase is initiated, the vent pipe is closed, and vapor in the tank is admitted to a condenser. The condenser condenses the vapor to obtain distilled water which is collected in a collection device. The gentle boiling phase continues until the level of water in the tank recedes to the level of a heater in the tank. At this time the heater is turned off and a drain valve opened to drain the water and residue remaining in the tank. After the tank is drained, water is again admitted to the tank for a fixed interval of time while the drain is kept open, thus flushing residues from the tank. After the flush water has drained from the tank, the drain is closed and a new distillation cycle is initiated.

19 Claims, 3 Drawing Sheets

METHOD AND APPARATUS FOR THE BATCH DISTILLATION OF WATER

FIELD OF THE INVENTION

This invention relates to a method and apparatus for the unattended batch distillation of water, the method and apparatus being particularly adapted for domestic use in producing pure distilled water for household use.

BACKGROUND OF THE INVENTION

Increasing concerns regarding pollution or contamination of water supplies and, in some instance, concerns regarding the effect of chemicals used in the treatment of public water supplies, has led to an increasing demand for household water purification systems. While distillation of water by heating it until it vaporizes, and then condensing the vapor and collecting the condensate is a well known technique for the purification of water, there has been a delay in the development of distillation systems suitable for home use and capable of unattended operation over several distillation cycles.

While batch distillation systems are widely used in various industrial applications, as exemplified by U.S. Pat. Nos. 4,401,512 and 3,364,371, these systems are not readily adaptable for domestic use. Distillation systems for home use are known as exemplified by U.S. Pat. Nos. 4,260,459 to Kirschman and 4,622,102 to Diebel. However, the Kirschmann device, while capable of batch operation, is not capable of continuous operation over several batches. It must be manually operated to fill the system with each batch of water. Furthermore, a valve for venting contaminants which vaporize below the boiling point of pure water must be manually opened and closed during distillation of each batch. The Diebel device, while fully automatic, is not readily adaptable for draining and flushing residue from the boiler as soon as the water therein recedes to a predetermined level.

Fitch U.S. Pat. No. 3,696,003 discloses a laboratory apparatus with means for cleaning the boiler by introducing a cleaning liquid which is distilled. The Fitch device maintains a constant water level in the boiler hence, before cleaning, the boiler must be emptied thereby wasting not only the water therein but also the energy used to heat it. Furthermore, the boiler emptying operation must be manually initiated.

SUMMARY OF THE INVENTION

An object of the present invention is to provide a fully automatic batch distillation method and apparatus which requires no manual intervention except for removal of collected distilled liquid and permits distillation in a sequence of like distillation cycles.

An object of the present invention is to provide a method and apparatus suitable for home use, and permitting the batch distillation of water during a sequence of unattended distillation cycles, each of which distills approximately the same volume of water.

An object of the present invention is to provide a method and apparatus for the distillation of water in a sequence of like distillation cycles, each distillation cycle including a fill phase, a vigorous boiling phase, a low boiling phase, a drain phase and a flush phase, the fill phase of the next distillation cycle being initiated automatically upon termination of the flush phase of a given cycle.

An object of the present invention is to provide a method as described above wherein the fill phase comprises admitting the same volume of water to a boiler tank on each distillation cycle.

An object of the invention is to provide a method as described above wherein no water is condensed during the vigorous boiling phase and all vapors generated are vented to the atmosphere.

An object of the present invention is to provide a water distillation method and apparatus wherein the boiler tank inside surface is maintained at a temperature above the boiling point of pure water so that contaminants which vaporize below the boiling point of pure water do not recondense on the interior surface of the tank.

An object of the invention is to provide a method as described above wherein the drain phase comprises draining from a boiler any residual water therein and the flush phase comprises admitting flush water to a boiler tank while the boiler drain is open so that the flush water and residual contaminants in the boiler are drained therefrom.

A further object of the invention is to provide apparatus for the batch distillation of water, including a boiler tank, fill means for admitting a batch of water containing contaminants to the boiler tank, a heater for selectively applying a low heat or high heat to the batch of water, a condenser connected through an inlet valve to the boiler tank, and a vent pipe having a pressure actuated valve therein, the vent pipe being connected to the boiler tank and terminating at a second end exterior of the distillation apparatus, and a sequence controller including circuits for energizing the fill means, energizing the heating means to apply high heat to the batch of water to vigorously boil it and vaporize contaminants therein which vaporize below the boiling point of pure water, the resulting increase in vapor pressure in the boiler tank causing the pressure actuated valve to open, the sequence controller further including means responsive to the temperature of the vapor for energizing the heater for low heat and opening the inlet valve when the temperature of the vapor is substantially equal to the boiling point of water, the opening of the inlet valve causing the vapor pressure in the boiler tank to drop whereby the pressure actuated valve closes.

An object of the present invention is to provide a batch distillation apparatus for distilling water in accordance with the method described above. The apparatus comprises a boiler tank connected to a vent pipe through a pressure controlled valve, and connected to a condenser coil through a condenser inlet valve. A heating unit is provided in the boiler tank and a drain pipe having a valve therein is connected to the bottom of the tank. Water is admitted to the tank through a water fill valve having a metering orifice. An electrical or electronic controller controls the apparatus to automatically perform a sequence of like batch distillation cycles. On each cycle, water is admitted to the boiler tank through the metering orifice for a fixed interval of time so that an equal volume of water is admitted during each distillation cycle. The water in the tank is first subjected to vigorous boiling to drive off contaminants which vaporize below the boiling point of pure water. Vapor pressure in the boiler tank actuates the pressure controlled valve in the vent pipe during this phase of a cycle so that the vaporized contaminants are vented to the atmosphere. After the vigorous boiling phase is completed, a gentle boiling phase is initiated and the condenser inlet valve is opened. This causes the pressure controlled valve in the vent pipe to close. During the gentle boiling phase, distilled water, condensed by the condenser, is collected in a collection device. The gentle boiling phase continues until the water level in the boiler tank recedes to the level of the heating unit. The resulting temperature rise at the heating unit is sensed by a sensor and the controller terminates power to the heater and initiates the drain phase by opening the drain valve for the boiler tank. After residual water is drained from the tank, the controller again actuates the water fill valve to admit flush water to the tank to flush residues therefrom. After the flush water has drained from the tank, the controller initiates the fill phase of a new distillation cycle if the distilled water collection device is not full.

Heating strips are provided on the exterior of the boiler tank for keeping the interior surface of the tank at a temperature at or slightly above, the boiling point of pure water. Power is made available to the heating strips upon initiation of the first distillation cycle and remains available until the distillation cycles terminate. Thermostatic switch control the application of power to the heating strips during this interval.

Other objects of the invention as well as its mode of operation and method of implementation will become obvious from the following description and the accompanying drawings.

DETAILED DESCRIPTION OF THE INVENTION

Figure 1:
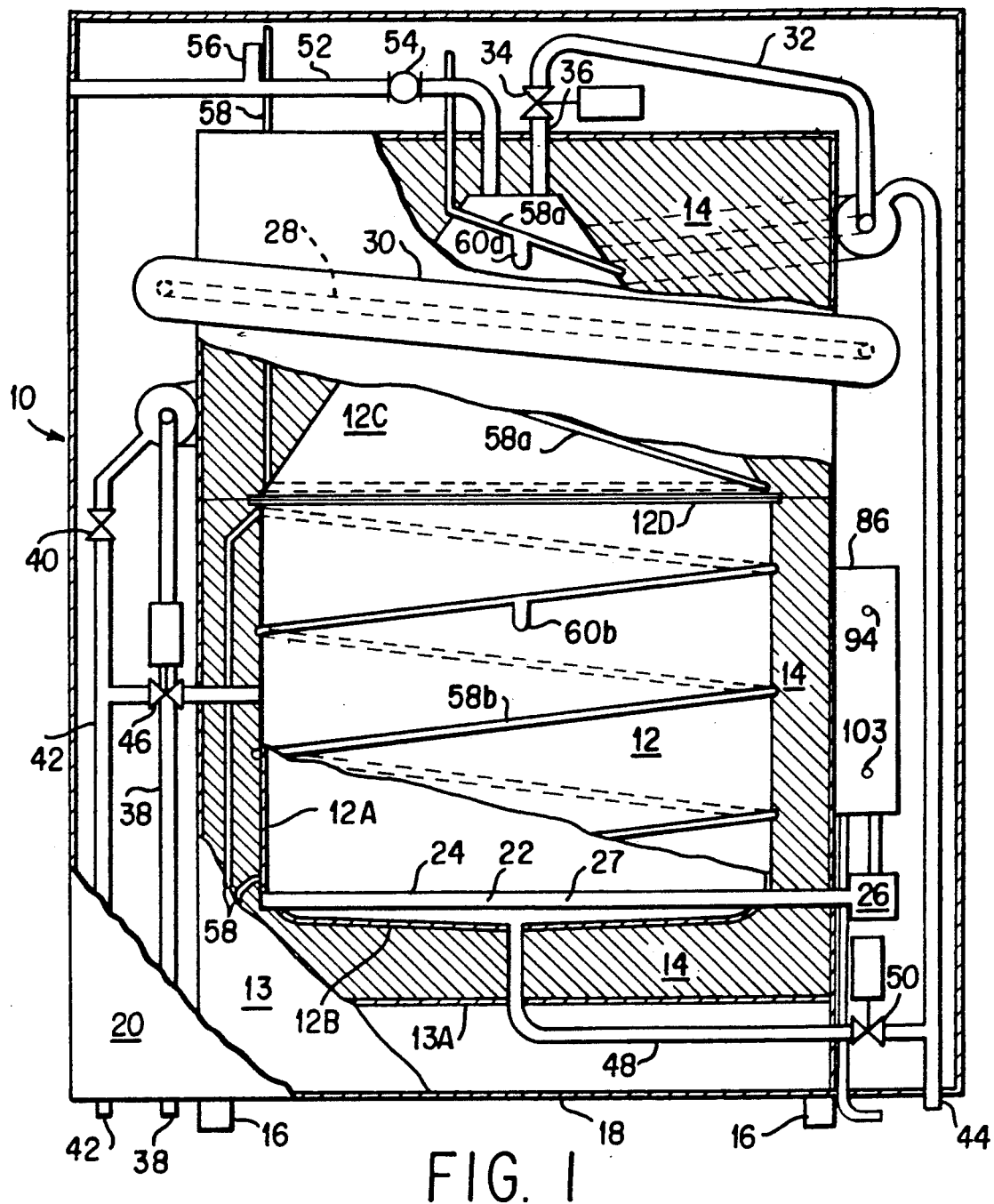
FIG. 1 is a part sectional elevational view of a water distillation apparatus constructed in accordance with the principles of the present invention.

As illustrated in FIG. 1, a batch distillation unit 10 constructed in accordance with the principles of the present invention comprises a vertically positioned boiler tank 12 having a cylindrical lower portion 12a with a slightly curved bottom end 12b and a removable conical top 12c. The cylindrical portion 12a is provided with a flange 12d to which the top 12c may be securely fastened by suitable fasteners (not shown). The tank 12 is surrounded by suitable heat insulating material 14 and the tank and insulation are supported by a frame 13 having a frame bottom 13a, and a bottom support 18 having feet 16. A sheet metal cylindrical enclosure 20 surrounds the entire distillation apparatus.

An electrical heating unit 22 is enclosed in the boiler tank 12 near its bottom in a pipe 24 which extends through the side of the tank. Pipe 24 serves to support the heating unit and also serves as a conduit for electrical wires which supply electrical power to the heating unit from a heater control circuit 26 mounted at the side of the frame 13. A thermal switch 27 (FIG. 4) is provided integral to heating unit 22 and electrical connections to this switch also extend through pipe 24. The thermal switch 27 controls the ending of the distillation phase of a cycle by sensing the higher temperature which occurs at the heating unit 22 when the water level in tank 12 recedes to the level of the heating unit.

It will be understood that the tank top 12c and the tank 12 may be provided with additional fittings to which inlet and outlet pipes, subsequently described, may be connected. For the sake of brevity fluid conduits are referred to herein as pipes but it will be understood that the term pipe includes tubing or any suitable form of fluid conduit.

A helical condensing unit comprising a condenser coil 28 surrounded by a cooling water jacket 30 is supported around frame 13. At its top end, the condenser coil 28 is connected through piping 32, a solenoid actuated condenser inlet valve 34, and a pipe 36 to the interior of the boiler tank 12. At its lower end, condenser coil 28 is connected to an outlet pipe 38 through which distilled water may flow under gravity to a distilled water collection vessel.

At its lower end, the cooling water jacket 30 is connected through a solenoid actuated inlet valve 40 and a fill pipe 42 to the household water supply. The upper end of the cooling water jacket 30 is connected by a drain pipe 44 to the household drain.

The household water supply is also connected via fill pipe 42 and a solenoid actuated water fill valve 46 to the boiler tank 12 so that the tank may be loaded with a batch of water at the start of each distillation cycle. In addition, fill valve 46 is activated for a short interval during a distillation cycle to supply water for flushing residue from the tank. An outlet located at the bottom of tank 12 is connected through an outlet pipe 48 and a solenoid actuated drain valve 50 to the drain pipe 44 so that the flush water and residue may be drained into the household drain.

The boiler tank 12 is provided with a vent pipe 52 for venting to the atmosphere, during an early phase of each distillation cycle, those contaminants in the water which vaporize at temperatures below the boiling point of pure water. A pressure relief valve 54 is provided in the vent pipe 52. In addition, a thermal sensor or switch 56 is provided outboard of the pressure relief valve 54. The pressure relief valve 54 is set to open with a minimal increase in pressure in the boiler tank 12 and thus allows contaminants which vaporize below the boiling point of pure water to be vented to the atmosphere. The thermal switch 56 is set so that it is actuated when the temperature in the vent pipe 52 reaches the temperature at which pure water boils.

Figure 2:
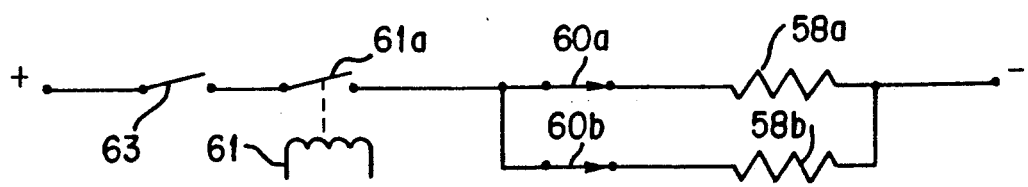
FIG. 2 illustrates the heating strip circuit for controlling the temperature of the wall of the tank.

The sides and top of boiler tank 12 may be provided with a heater in the form of two resistive heating strips 58a, 58b. The purpose of the heater strips is to insure that the boiler tank 12 above the water fill level of the tank is hot before the water is boiled. This prevents contaminants that vaporize below the boiling point of water from condensing inside tank 12, as would occur if the wall of the tank is cold. Temperature sensors in the form of thermostatic or temperature sensitive switches 60a and 60b are provided for sensing when the wall of the tank has been heated to a temperature such that the vapor will not condense upon contacting the wall. The heater strips 58a and 58b and switches 60a and 60b are located adjacent the exterior surface of tank 12, underneath the insulating material 14. Two heating strips are provided, one for the top 12c of the tank and one for the lower portion of the tank so that the top of the tank may be removed without disturbing the heater strips. As shown in FIG. 2, the heating strip 58a is connected across the AC power supply in series with the switch 60a, the contacts 61a of a heating strip control relay 61, and a power on/off switch 63 which controls all power to the distillation apparatus. Heating strip 58b and switch 60b are also connected in series with switch 63 and switch contacts 61a. Switches 60a and 60b are normally closed. After power is on (switch 63 closed) the heater strips 58a and 58b generate heat to warm the walls of the boiler tank when a controller (subsequently described) energizes relay 61 to close contacts 61a. As long as contacts 61a and 63 remain closed, the thermostatic switches 60a and 60b open and close to regulate the heating of the walls of tank 12 so that the interior surfaces of the tank are maintained at about the boiling point of pure water. This prevents the contaminant vapors which form below the boiling point of water from condensing on the interior walls of the tank.

Since the embodiment of the invention illustrated in FIG. 1 utilizes gravity flow to remove the distilled water from the distillation unit, any reservoir or collecting device for collecting the distilled water must be located at a level which permits gravity flow from the condenser coil 28 into the collection device. The collection device may take any form so long as it is provided with sensing means for sensing when the collection device is filled to a point such that it cannot accept another batch of water.

Figure 3:
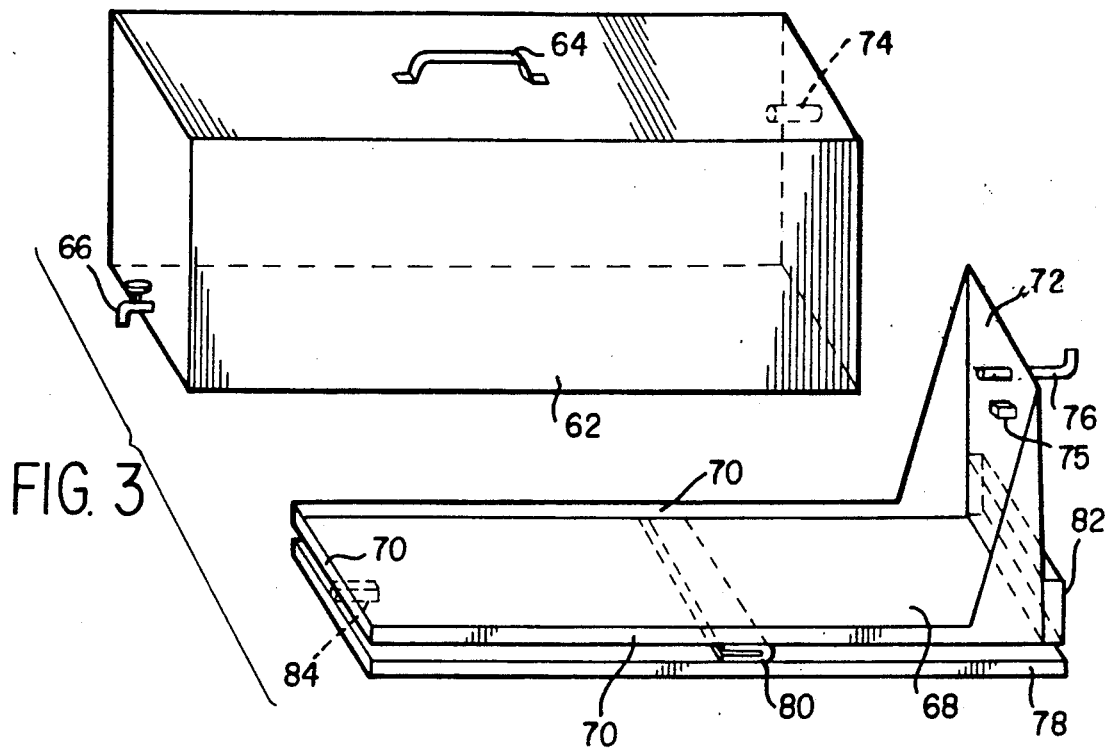
FIG. 3 shows a distillate collection device and a platform for receiving and supporting the collection device.

As illustrated in FIG. 3, the collection device may comprise a carboy 62 having a carrying handle 64 and a spigot 66. The carboy is adapted to rest within a tray 68 having short vertically extending edges 70 on three sides and a vertically extending end panel 72. The carboy is provided with a quick disconnect sanitary seal 74 and an inlet tube 76 is mounted so that it extends through panel 72. The tube 76 is connected by a flexible conduit (not shown) to the outlet pipe 38 of FIG. 1.

The carboy 62 is mounted in tray 68 by lowering the right end of the carboy between opposing edges 70 of the tray, and then sliding the carboy to the right until the left end of the carboy slides over the end edge 70 onto the tray. As the carboy slides to the right, the inlet tube 76 slides into, and opens, the quick-disconnect sanitary seal 74 so that distilled water may flow into the carboy. As the carboy moves into position on the tray it actuates a switch 75 to signal a controller that a carboy is in place.

The tray 68 is pivotally secured to a platform 78 by a hinge 80. The pivot point of the hinge is offset to the right of the midpoint of the longitudinal axis of platform 78 as viewed in FIG. 3. However, a counterbalance weight 82 is attached to panel 72 so that the tray pivots clockwise about hinge 80 until its right end contacts platform 78. The pivot point of hinge 80 is located such that when the carboy is filled to a certain level, the added weight of the distilled water causes the tray 68 to pivot counterclockwise about the pivot point thereby actuating a microswitch 84 mounted between platform 78 and tray 68. The arrangement is such that the microswitch is actuated when the carboy is "full", that is, the carboy is filled to a level such that it cannot accept the volume of distilled water produced in one distillation cycle. The signal produced by microswitch 84 is utilized to prevent initiation of a distillation cycle if the amount of distilled water produced by that cycle would cause overflow from the carboy.

Figure 4:
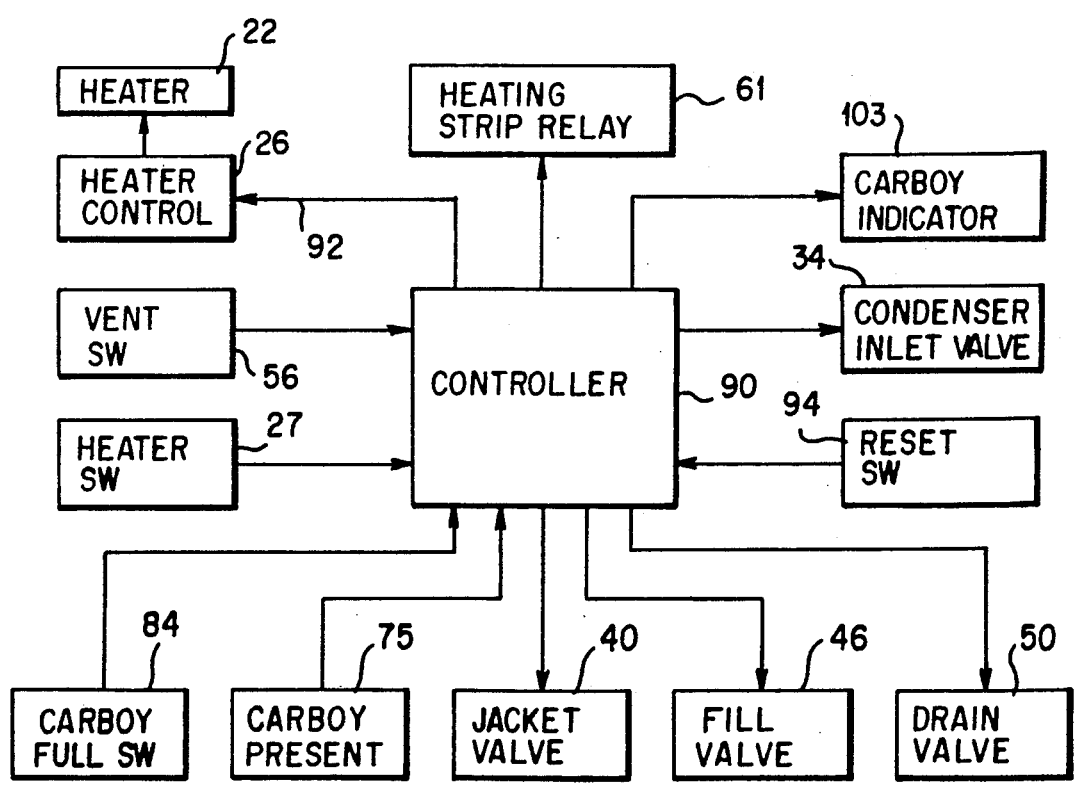
FIG. 4 is a block diagram of a control circuit for automatically controlling the water distillation apparatus of FIG. 1; and, FIG. 5 is a flow diagram illustrating the sequence of operation of the control circuit.

A control circuit or controller for controlling the operation of the distillation unit may be mounted in a housing 86 (FIG. 1) which is, in turn, mounted on the frame 13. The controller may be a microprocessor, specialized integrated circuit, or a combination of timers and relays so long as it executes the sequence of steps illustrated in FIG. 5. As illustrated in FIG. 4, a controller 90 has input leads connected to receive input signals from the heater thermal switch 27, the vent thermal switch 56, the carboy present switch 75, the carboy full switch 84, and a reset switch 94. The controller has output leads connected to selectively control the condenser inlet valve 34, the condenser water jacket inlet valve 40, the fill valve 46, the drain valve 50 and the heating strip control relay 61. In addition, controller 90 has output leads 92 connected to the heater control circuit 26 to select whether the circuit 26 applies no power, power for low heat, or power for high heat to the electrical heating unit 22. A manually actuated reset switch 94 is mounted so as to be accessible from the exterior of the housing 86. This switch is provided for manually re-starting operation of the controller 90 if it should stop as a result of a maintenance procedure or a malfunction.

Figure 5:
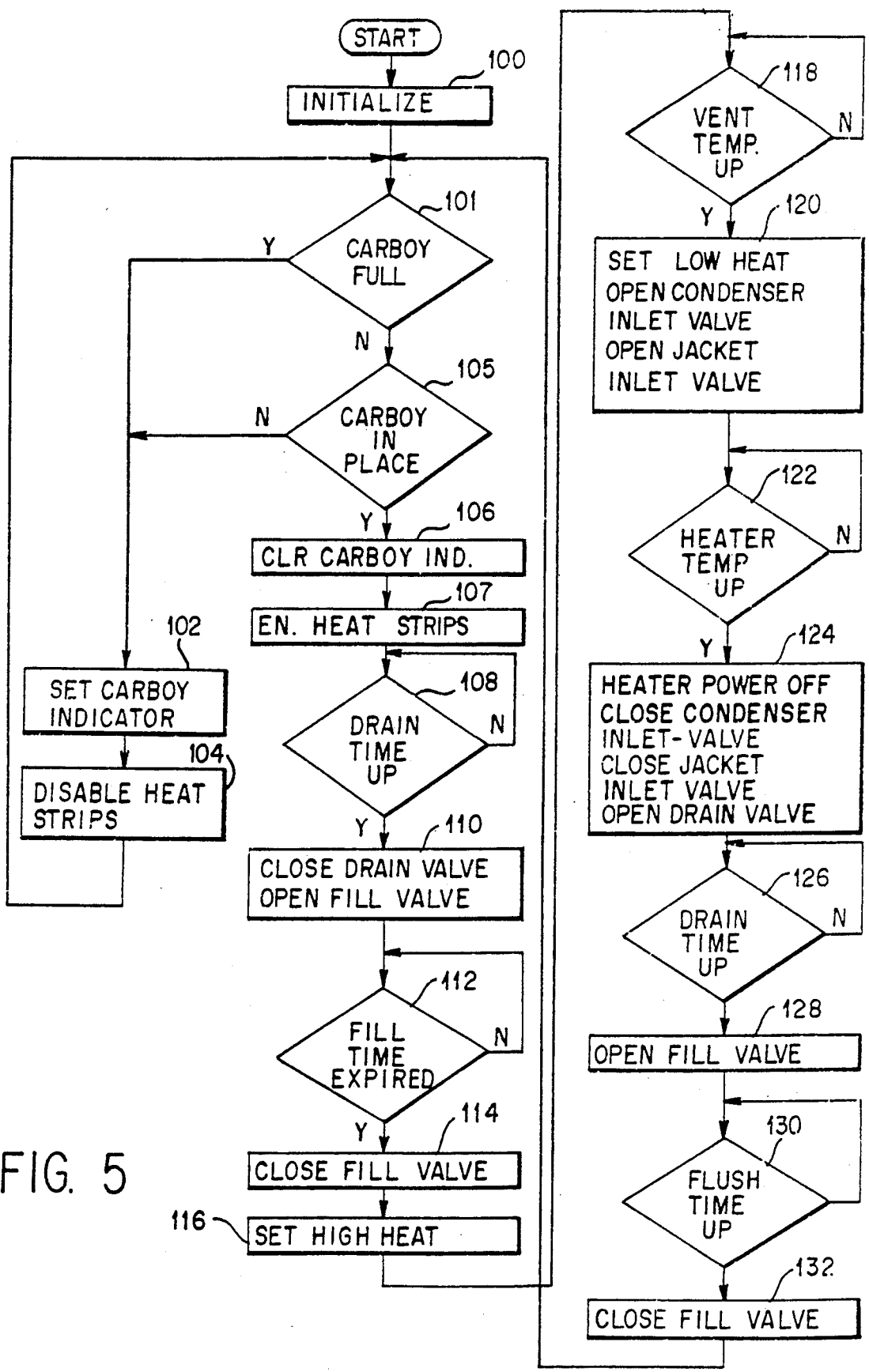

The controller 90 operates in accordance with the flow diagram illustrated in FIG. 5. Operation of the controller 90 is initiated at step 100 by manually actuating the reset switch 94 or by turning on the main power switch 63. At step 100 the controller 90 issues signals to initialize various relays and solenoid-operated valves. Signals are sent to fill valve 46 to close it, &:o drain valve 50 to open it, to the water jacket inlet valve 40 to close it, and to the heater control circuit 26 terminate power to the electrical heating unit 22. The initialization signals are sent to the various solenoid-actuated valves as a precaution since these valves are biased by springs or some other means so that they assume the normalized state if power to the distillation unit is terminated. The controller 90 also issues a signal to the solenoid-actuated condenser inlet valve 34 to close it, this valve normally being biased open when no power is applied to the distillation unit.

At step 101 the controller tests the state of the carboy full switch 84. If the carboy 62 is full, that is, so full that it cannot accept another complete batch of distilled water, the controller energizes an audible or visual indicator 103 at step 102 and deenergizes the heating strip relay 61 at step 104. The controller then returns to step 101 to again test the carboy full switch. Steps 101, 102 and 104 are repeated until the full carboy is removed.

When the test at step 101 indicates that the carboy is not full, the controller then executes step 105 to test carboy present switch 75. If switch 75 is not actuated it means that no carboy is in place so the controller sets the carboy indicator 103 at step 102 and returns to step 101. Although a single carboy indicator 103 is shown in FIGS. 1 and 4, it will be understood that two indicators may be provided, one to indicate that a carboy is in place and another to indicate that a carboy is full.

If the test at step 105 indicates that a carboy is in place, the controller advances to step 106 to turn off the carboy indicator 103. At step 107 the controller energizes the heating strip control relay 61 to close contacts 61a. This places the heating of heating strips 58a and 58b under control of their respective thermostatic switches 60a and 60b so that the walls of the tank 12 may be heated to, and maintained at, the boiling point of water.

At step 108 the controller 90 waits for an interval of time sufficient for a full batch of water in the tank 12 drain therefrom through outlet pipe 48 and drain valve 50. The purpose of step 108 is to insure that the tank 12 is not overfilled, as might occur if the reset switch 94 is actuated too soon after a momentary power loss. In this regard, the solenoid actuated drain valve 50 is normally open when its solenoid is not energized. On the other hand, the fill valve 46 is closed when its solenoid is not energized. In case of a power loss, some or all of the water in tank 12 will drain out of the tank, depending on the time interval the power is lost. Step 108 is executed by the controller to insure, in case of a momentary power loss, that neither of the solenoids for valves 46 or 50 is energized until tank 12 is empty, even though the reset switch 94 is manually actuated immediately upon resumption of power. On the second and subsequent distillation cycles the execution of step 108 insures that all of the flush water from the preceding cycle may drain from tank 12.

After the time interval has expired, the controller initiates a fill phase. At step 110 it energizes the solenoid of drain valve 50 to close the valve, and energizes the solenoid of fill valve 46 so that water begins flowing from the household water supply into tank 12. The valve 46 has a metering orifice so that a predetermined volume of water passes through the valve per unit of time. At step 112 the controller tolls the interval of time required to fill the tank 12 with a batch of water.

After the fill interval has expired, the controller executes step 114 to close fill valve 46 and step 116 to set the heater control circuit 26 so that high heating power is applied to the heating unit 22. The controller then advances to step 118 where it monitors the vent thermal switch 56.

When high heating power is applied to the heating unit 22 at step 116 it initiates a vigorous boiling phase of the distillation cycle during which the batch of water is brought to a high boil. During this vigorous boiling phase, contaminants in the water which vaporize below the boiling point of pure water are vaporized. Since the condenser inlet valve 34 was closed at step 100, pressure increases inside tank 12 and the increased vapor pressure opens the pressure relief valve 54 so that the contaminants are vented from the apparatus through vent pipe 52. The vigorous boiling phase continues until the temperature of the vapor venting through pipe 52 is high enough to actuate the vent thermal switch 56. The controller senses actuation of the switch (step 118) and moves to step 120.

At step 120, a low or gentle boiling phase of the distillation cycle is initiated to distill pure water and collect it into the carboy 62. The controller applies a signal to the heater control circuit 26 so that low power is applied to heating unit 22. It also applies a signal to the solenoid of condenser inlet valve 34 to open the valve. With valve 34 open, the pressure in tank 12 is reduced so that pressure relief valve 54 closes. The flow of vapor through vent pipe 52 is thus stopped while the flow of vapor into the condenser coil 28 is initiated. The controller also applies a signal at step 120 to the solenoid of the water jacket inlet valve 40. The unheated water flowing through water jacket 30 cools the condenser coil 28 so that the vapor of pure water within the coil condenses on the interior surface of the coil. The distilled water thus produced flows through outlet pipe 38 to the carboy shown in FIG. 3.

After step 120 is executed, the controller advances to step 122 where it senses the state of the temperature sensitive switch 27 in the heating unit. The controller remains at step 122 and the gentle boil phase of the distillation cycle continues for a period of time during which the level of water in tank 12 recedes as the water is vaporized. When the water in tank 12 recedes to a level such that the heating unit 22 is no longer covered by water, the temperature of the heating unit begins to rise. As the temperature rises, the temperature sensitive switch 27 is activated to signal the end of the gentle boiling phase.

At the completion of the gentle boil phase, the controller advances to step 124 and initiates a drain phase during which residual water, remaining in tank 12 after the gentle boil phase, is drained from the tank. At step 124 the controller turns off power to the heating unit 22, closes the condenser inlet valve 34 closes the water jacket inlet valve 40, and opens the drain valve 50. Opening of valve 50 permits the remaining water in tank 12, which includes contaminants such as heavy metals and minerals that do not vaporize at or below the boiling point of pure water, to drain from the tank into the household drain.

After the drain valve 50 is opened, the controller advances to step 126 where it tolls a fixed interval of time. This interval should be long enough to permit the remaining water to drain from tank 12. At the end of the time interval, the controller advances to step 128 where it opens the fill valve 46 to begin the flush phase of the distillation cycle.

When fill valve 46 is opened, water from the household supply enters tank 12 to flush therefrom any residue remaining in the tank. This flushing action further reduces the build-up of heavy metals and/or minerals on the interior wall of tank 12 and the surfaces of heating unit 22.

At step 130, the controller tolls an interval of time sufficient to accomplish the flushing of residues from the tank. The controller then advances to step 132 where it closes the fill valve 46 thus terminating the flow of flush water into the tank. Any flush water in the tank at this time may drain from the tank since the drain valve 50 is not closed until execution of step 108 during the next cycle.

The closing of fill valve 46 completes the distillation cycle. The controller returns to step 101 to automatically begin a new distillation cycle.

From the foregoing description it is evident that the present invention provides a novel method and apparatus for the batch distillation of water during an automatic sequence of distillation cycles, each of the cycles, including a fill phase, a vigorous boiling phase, a gentle boiling phase a drain phase, and a residue flush phase. The same volume of water is admitted to the boiler tank during each fill phase so that like volumes of water are distilled during each distillation cycle. While the preferred embodiment is described in terms of a water distillation unit suitable for home use, it will be understood that distillation of other liquids in other embodiments may be carried out without departing the spirit and scope of the invention as defined by the appended claims.

The embodiments of the invention in which an exclusive property or privilege is claimed are defined as follows.

I claim:

1. A batch distillation apparatus comprising:
   a boiler tank;
   fill means for admitting a batch of water containing contaminants to said boiler tank;

heating means for selectively applying a high heat or low heat to said batch of water containing contaminants;

condenser means connected through a condenser inlet valve to said boiler tank;

a vent pipe means having a pressure actuated valve therein, said vent pipe means being connected to one end of said boiler tank and terminating at a second end exterior of the distillation apparatus; and, sequence control means for controlling said fill means, said heating means and said condenser inlet valve, said sequence control means including, first means for energizing said fill means to admit a batch of water containing contaminants to said boiler tank;

second means for energizing said heating means to apply high heat to said batch of water containing contaminants, said high heat vigorously boiling said batch to vaporize contaminants therein which vaporize below the boiling point of the water, the resulting increase in vapor pressure in said boiler tank causing said pressure actuated valve to open thereby admitting vapor to said vent pipe means; and, third means responsive to the temperature of the vapor admitted to said vent pipe means for energizing said heating means to initiate said low heat and opening said condenser inlet valve, the opening of said condenser inlet valve causing the vapor pressure in said boiler tank to drop whereby said pressure actuated valve closes.

2. A batch distillation apparatus as claimed in claim 1 wherein said third means includes sensor means in said vent pipe means for sensing the temperature of vapor in said vent pipe means and producing an output signal when the temperature of the vapor in said vent pipe means reaches the temperature at which the water boils, and a controller responsive to said sensor means for applying signals to said heating means and said condenser inlet valve.

3. A batch distillation apparatus as claimed in claim 1 wherein said sequence control means includes a microprocessor.

4. A batch distillation apparatus as claimed in claim 1 wherein said fill means comprises a solenoid actuated valve and a metering orifice connected between a source of water containing contaminants and said boiler tank, said first means energizing said solenoid for a predetermined fixed interval of time whereby every batch of water containing contaminants admitted to said boiler tank contains the same volume.

5. A batch distillation apparatus as claimed in claim 1 and further comprising means for maintaining the walls of said boiler tank at a temperature at least as high as the temperature at which the water vaporizes.

6. A batch distillation apparatus as claimed in claim 1 and further comprising:

drain means connected to the bottom of said tank, said drain means having a drain valve therein, said sequence control means further including sensor means for sensing the level of water in said boiler tank and producing a signal when the level of water in said boiler tank drops to a given level, and a controller responsive to said signal for opening said drain valve and applying a signal to said heating means to terminate heating of said water.

7. A batch distillation apparatus as claimed in claim 6 wherein said sequence control means includes further means for energizing said fill means for a fixed interval of time to admit flush water to said boiler tank while said drain valve is open to drain flush water from said boiler tank.

8. A batch distillation apparatus as claimed in claim 7 wherein said sequence control means includes further means automatically operative after said flush water has drained from said tank for closing said drain valve and energizing said first means to admit another batch of water containing contaminants to said boiler tank.

9. An automatic sequential batch distillation apparatus comprising:

a boiler tank;

heating means for selectively applying a high heat or a low heat to a liquid in said boiler tank;

fill means including means for admitting a batch of water containing contaminants to said boiler tank;

vent means extending between said boiler tank and the exterior of the distillation apparatus, said vent means including a pressure actuated valve responsive to the pressure of vapors produced in the boiler tank for selectively controlling the flow of vapor through said vent means;

condensing means for condensing water vapor, said condensing means being connected to said boiler tank through a condenser inlet valve;

drain means having a drain valve therein, said drain means connecting to a lower portion of said boiler tank whereby all water in said boiler tank may be drained therefrom; and, sequence control means including a sequence controller, first sensing means for producing a first signal when the temperature of said vapor flowing through said vent means is as high as the temperature at which said water boils, and second sensing means for producing a second signal when the level of water in said boiler tank drops to a predetermined level;

said sequence controller being responsive to said first and second signals for automatically sequencing said heating means, said fill means, said condenser inlet valve and said drain valve through a plurality of distillation cycles to distill a plurality of batches of water containing contaminants.

10. An automatic sequential batch distillation apparatus as claimed in claim 9 wherein said sequence controller, on each of said cycles, automatically applies a signal to said fill means to admit a batch of water containing contaminants to said boiler tank;

applies a signal to said heating means so that said heating means applies high heat to said batch of water containing contaminants in said boiler tank;

in response to said first signal, applies a signal to said heating means so that said heating means applies low heat to said batch of water containing contaminants in said boiler tank and applies a signal to said condenser inlet valve to open said condenser inlet valve; and, in response to said second signal applies a signal to said heating means so that said heating means terminates all heating of said water containing contaminants and applies a signal to said drain valve to open said drain valve whereby the remaining water and contaminants in said boiler tank may drain therefrom.

11. An automatic sequential batch distillation apparatus as claimed in claim 10 wherein said sequence controller includes means automatically operative after said remaining water and contaminants have drained from said boiler tank for energizing said fill means to admit flush water to said boiler tank, said flush water draining from said boiler tank through said drain valve.

12. An automatic sequential batch distillation apparatus as claimed in claim 11 wherein said sequence controller includes means for automatically initiating the next distillation cycle after all said flush water has drained from said boiler tank, said next distillation cycle being initiated by closing said drain valve and applying a signal to said fill means whereby the next batch of water containing contaminants is admitted to said boiler tank.

13. An automatic sequential batch distillation apparatus as claimed in claim 10 wherein said sequence controller is a microprocessor.

14. An automatic sequential batch distillation apparatus as claimed in claim 10 wherein said condensing means comprises a condensing coil connected to said condenser inlet valve and a water jacket surrounding said condensing coil and connected through a water jacket inlet valve to a source of cooling liquid.

15. An automatic sequential batch distillation apparatus as claimed in claim 14 wherein said sequence controller applies signals to said water jacket inlet valve to open said water jacket inlet valve in response to said first signal and close it in response to said second signal, said sequence controller also being responsive to said second signal to close said condenser inlet valve.

16. An automatic sequential batch distillation apparatus as claimed in claim 9 and further comprising:
a collection device for collecting the condensed water vapor produced in said condensing means;
means for generating an inhibit signal when said collection device is so full that it cannot accept the condensate resulting from distillation of another full batch of water containing contaminants; and
means for applying said inhibit signal to said sequence controller to prevent it form initiating further distillation cycles.

17. A method of automatically and sequentially distilling batches of water containing contaminants therein using a boiler tank and a condenser, said batches comprising equal predetermined volumes of said water, said method comprising the execution of a distillation cycle for each of the batches, each distillation cycle comprising the following steps in sequence:

filling the boiler tank with a batch of said water having contaminants therein;
vigorously boiling said water containing contaminants while venting the boiler tank to the atmosphere to thereby remove from the water the contaminants which vaporize below the boiling point of the water;
sensing the temperature of the vapor being vented;
terminating said venting when the temperature of the vapor being vented exceeds a predetermined temperature and thereafter gently boiling said liquid while admitting the vapor produced thereby to the condenser to thereby obtain the condensate of the vaporized water;
terminating the gentle boiling of said water and draining from the boiler tank any water and contaminants remaining therein when the level of water in the boiler tank reaches a predetermined level;
flushing the boiler tank of any contaminants remaining therein by admitting flush water to the boiler tank and permitting it to drain therefrom with the remaining contaminants; and,
after said flush water has drained, automatically initiating the next distillation cycle.

18. A method as claimed in claim 17 wherein walls of the boiler tank are maintained at a temperature at least as high as the temperature at which the water vaporizes to thereby prevent vapors of the contaminants produced during the vigorous boiling from condensing on the walls.

19. A batch distillation apparatus comprising:
a boiler tank having walls for holding a batch of water containing contaminants,
vents means for selectively venting said boiler tank to the exterior of the apparatus;
condenser means connected through a condenser inlet valve to said boiler tank;
heating means for selectively applying a high heat or a low heat to said water containing contaminants, said high heat vaporizing contaminants in said water which vaporize at temperatures below the boiling point of water;
means for selectively opening said vent means when high heat is applied to said water containing contaminants and opening said inlet valve when low heat is applied to said water containing contaminants; and,
means for heating the walls of said boiler tank to at least the temperature at which water vaporizes to thereby prevent condensation on said walls of the contaminant vapors.

* * * * *